United States Patent [19]

Suh

[11] Patent Number: 5,815,216
[45] Date of Patent: Sep. 29, 1998

[54] DISPLAY DEVICE CAPABLE OF DISPLAYING EXTERNAL SIGNALS AND INFORMATION DATA USING A DOUBLE-PICTURE TYPE SCREEN

[75] Inventor: Moon-hwan Suh, Seoul, Rep. of Korea

[73] Assignee: Samsung Electronics Co., Ltd., Kyungki-Do, Rep. of Korea

[21] Appl. No.: 680,045

[22] Filed: Jul. 15, 1996

[30] Foreign Application Priority Data

Sep. 14, 1995 [KR] Rep. of Korea ...................... 95-30379

[51] Int. Cl.⁶ .................................................. H04N 5/45
[52] U.S. Cl. ............................ 348/588; 348/565; 348/569
[58] Field of Search ..................................... 348/563, 564, 348/565, 569, 588, 590; H04N 5/45, 5/445

[56] References Cited

U.S. PATENT DOCUMENTS 5,650,827   7/1997   Tsumori et al. ......................... 348/565
5,726,702   3/1998   Hamaguchi et al. ................... 348/563

FOREIGN PATENT DOCUMENTS 08111831   4/1996   Japan .............................. H04N 5/45

*Primary Examiner*—Glenton B. Burgess
*Attorney, Agent, or Firm*—Sughrue, Mion, Zinn, Macpeak & Seas, PLLC

[57] ABSTRACT

A display device displays first and second video signals on a double-picture type screen. The device comprises a double window processing unit, a microcomputer, an information processing unit, a compressor, first through fourth switches, and a display unit. The double window processing unit processes the first and second video signals and outputs a television video signal and first synchronization signals. The microcomputer controls the double window processing unit and outputs first and second switching signals. The information processing unit receives data from a value added network, outputs a corresponding information video signal, generates second synchronization signals, and outputs third and fourth switching signals. The compressor receives an external video signal, generates a corresponding compressed is video signal, and outputs third synchronization signals. The first and fourth switches selectively output the first, second, or third synchronization signals as selected synchronization signals. The second and third switch selectively output the television video signal, the compressed video signal, or the information video signal as a selected video signal. The display unit displays the selected video signal based on the selected synchronization signals. As a result of the configuration above, the information video signal, the external video signal, and the television video signal can be displayed in various configurations.

28 Claims, 3 Drawing Sheets

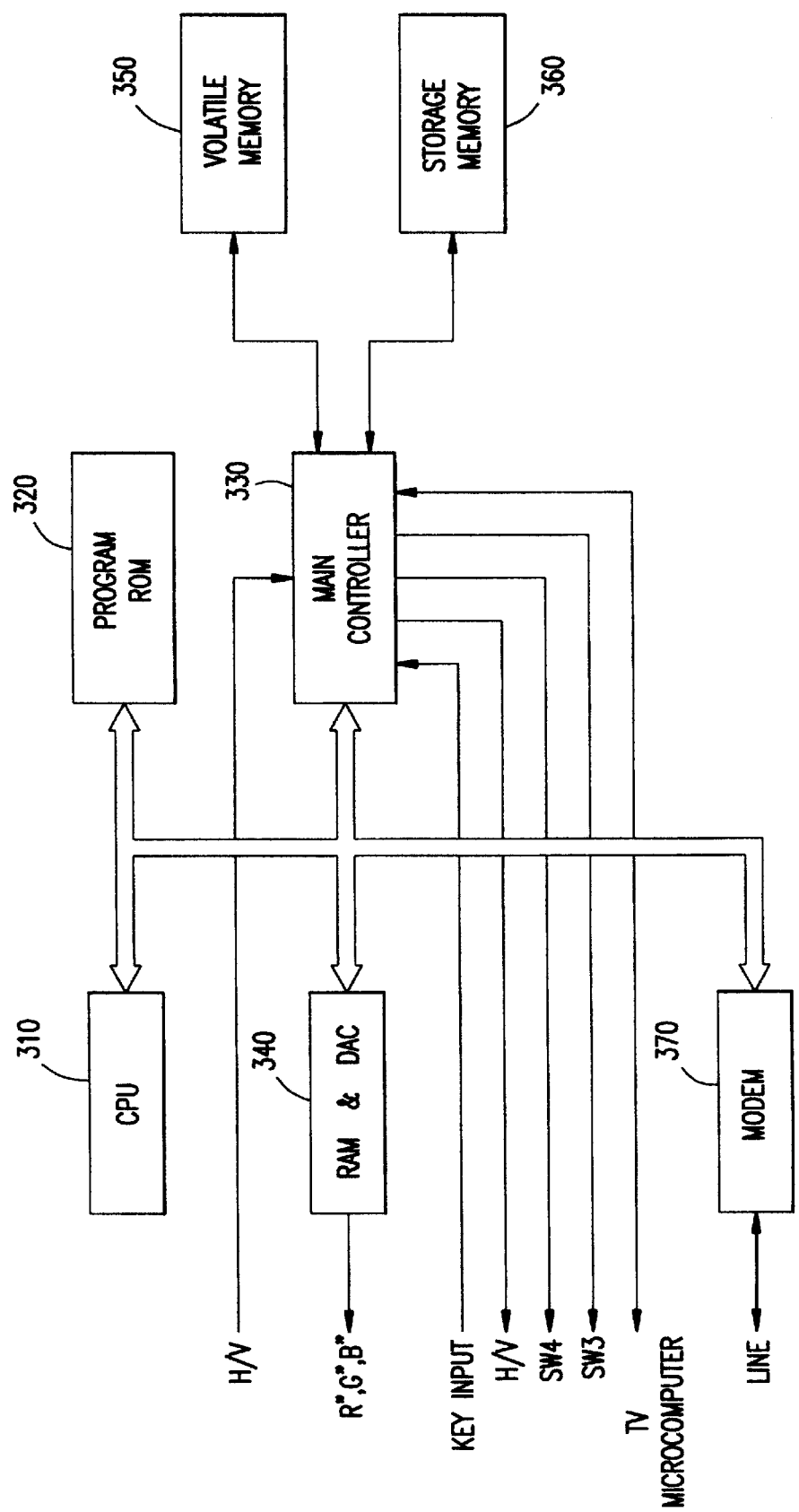

DISPLAY DEVICE CAPABLE OF DISPLAYING EXTERNAL SIGNALS AND INFORMATION DATA USING A DOUBLE-PICTURE TYPE SCREEN

FIELD OF THE INVENTION

The present invention relates to a double window television which uses a double-picture type screen. More particularly, the present invention relates to a double window television which adopts a double window scanning method and which is capable of displaying communication information data and a video graphics array ("VGA") signal on the double-picture type screen.

BACKGROUND OF THE INVENTION

In general, a double window television has a screen ratio of 16:9 and thus, has a screen which is horizontally elongated when compared to the screen of a typical television system. Moreover, in order to produce the double-picture type screen, the screen is vertically divided into two halves via a double window scanning method. As a result, each half of the screen is capable of displaying a picture having a screen ratio of 4:3 (i.e. the screen ratio of the typical television system). Consequently, two different picture signals having the same screen ratio can be displayed on a single screen.

An intelligent double window television is capable of being connected to a value added network ("VAN") to provide various communication services to a viewer by displaying various data received from the VAN. The intelligent double window television may comprise an information processing unit which receives communication information data from the VAN and processes the information data to produce corresponding information RGB signals. Then, the processing unit may selectively output the RGB signals and appropriate switching control signals to display the information data on a cathode ray tube ("CRT").

Furthermore, the intelligence double window television may also comprise a television processor which receives television signals and processes such signals to generate television RGB signals. Then, the intelligent double window television may selectively display either the information RGB signals or the television RGB signals based on the switching control signals output from the information processing unit.

Various kinds of communication services and data may be transmitted to the intelligent double window television via the VAN. For example, such television may receive stock market quotes, news, weather, or television scheduling information. Since such information can be easily viewed on the television screen, people who have little experience with computers are able to use the communication services contained on the VAN.

However, one disadvantage of the intelligent double screen television is the versatility with which it can display communication information data. Specifically, when the communication service is being viewed by a viewer, the television can only display the communication information data on the television screen. Accordingly, intelligent double window televisions are unable to simultaneously display information data and a television program.

SUMMARY OF THE INVENTION

In order to overcome the above disadvantages, an object of the present invention is to provide a device which is capable of selecting and displaying information data or external display signals (e.g. a video graphics array signal received from a personal computer) in various configurations by using a double-picture type screen of a double window television.

In order to accomplish the above object, a display device which is capable of displaying a first video signal and a second video signal on a display of a double-picture type screen is provided. In particular, the display device comprises: a double window processing unit for processing the first video signal and the second video signal to be displayed on said double-picture type screen, wherein the double window processing unit outputs a television video signal and first horizontal and vertical synchronization signals which correspond to at least one of the first video signal and the second video signal; a television microcomputer for controlling an operation of the double window processing unit and for outputting a first switching control signal and a second switching control signal; information processing means for receiving information data from a value added network, wherein the information processing means outputs an information video signal relating to the information data, generates second horizontal and vertical synchronization signals corresponding to the information video signal, and outputs third and fourth switching control signals; compressing means for receiving an external video signal and compressing the external video signal into a compressed video signal, wherein the compressing means further outputs third horizontal and vertical synchronization signals corresponding to the compressed video signal; first switching means for selectively outputting either the first horizontal and vertical synchronization signals or the third horizontal and vertical synchronization signals as intermediate synchronization signals in accordance with the first switching control signal; second switching means for selectively outputting either the television video signal or the compressed video signal as an intermediate video signal in accordance with the second switching control signal; third switching means for selectively outputting either the intermediate video signal or the information video signal as a selected video signal in accordance with the third switching control signal; fourth switching means for selectively outputting either the intermediate synchronization signals or the second horizontal and vertical synchronization signals as selected synchronization signals in accordance with the fourth switching control signal; and a display control means for causing the selected video signal to be displayed on the display in accordance with the selected synchronization signals.

BRIEF DESCRIPTION OF THE DRAWINGS

The above objects and advantages of the present invention will become more apparent by describing in detail preferred embodiments thereof with reference to the attached drawings in which:

FIG. 2 is a detailed block diagram of the information processing unit shown in FIG. 1;

DETAILED DESCRIPTION OF THE INVENTION

Figure 1:
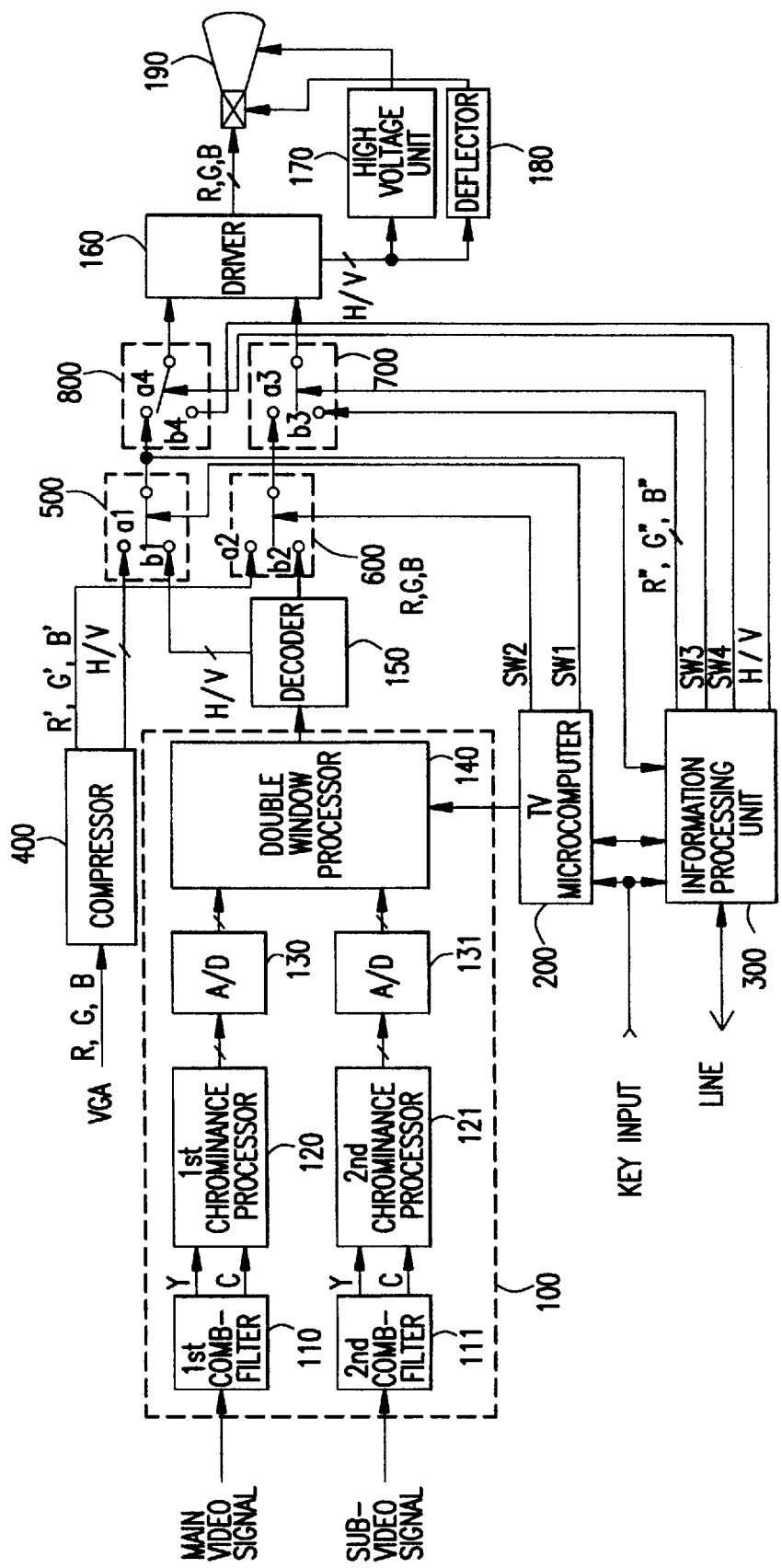
FIG. 1 is a block diagram of a display device according to one embodiment of the present invention.

FIG. 1 illustrates a display device in accordance with one embodiment of the present invention. As shown in the figure, the device comprises a double window processing unit 100, a decoder 150, a TV microcomputer 200, an information processing unit 300, a compressor 400, and first through fourth switching units 500, 600, 700, and 800.

The double window processing unit 100 simultaneously inputs a main video signal TV1 and a sub-video signal TV2 and generates double-picture type screen signals based on the input video signals TV1 and TV2. In order to perform the above function, the processing unit 100 comprises a first and second comb-filters 110 and 111, first and second chrominance processors 120 and 121, first and second analog-to-digital (A/D) converters 130 and 131, and a double window processor 140.

The first comb-filter 110 inputs the main video signal TV1, eliminates noise from the signal TV1, and outputs corresponding main luminance and chrominance signals Y and C. The first chrominance processor 120 processes the signals Y and C, and the first analog-to-digital (A/D) converter 130 converts the processed signals into digital data. Similarly, the second comb-filter 111 inputs the sub-video signal TV2, eliminates noise from the signal TV2, and outputs corresponding sub luminance and chrominance signals Y and C. The second chrominance processor 121 processes the signals Y and C, and the second analog-to-digital (A/D) converter 131 converts the processed signals into digital data. Then, the double window processor 140 inputs the data from the A/D converters 130 and 131 and generates corresponding double-picture type screen signals to be displayed on the partitioned screens of a double-picture type screen.

The decoder 150 inputs the double-picture type screen signals from the double window processing unit 100 and outputs corresponding RGB signals and horizontal and vertical (H/V) synchronization signals.

The TV microcomputer 200 inputs a key input which may be generated via a viewer selection device (e.g. a keypad or a remote control unit (not shown)) and may control various is operations of the double window processing unit 100 based on the key input. Furthermore, the microcomputer 200 also outputs first and second switching control signals SW1 and SW2 to respectively control the positions of the first and second switching units 500 and 600.

The information processing unit 300 inputs various data and commands and outputs corresponding data and control signals to control the manner in which signals and information are displayed by the display device. For example, the processing unit 300 inputs the key input generated via the viewer selection device (not shown) and inputs the H/V synchronization signals output from the first switching unit 500. Also, the unit 300 is connected to a value added network ("VAN") and may receive and decode text or graphic information data from the VAN. As a result of the input information, the processing unit 300 outputs information R"G"B" signals and H/V synchronization signals to display certain data on a cathode ray tube ("CRT") 190. Furthermore, the unit 300 outputs third and fourth switching control signals SW3 and SW4 to control the position of the third and fourth switching units 700 and 800. In addition, the processing unit 300 is capable of receiving and transmitting data in series with the TV microcomputer 200.

The compressor 400 inputs external VGA RGB signals and compresses such signals to three-fourths their initial size to produce compressed R'G'B' signals. Furthermore, the compressor 400 extracts the H/V synchronization signals from the input signals and outputs such synchronization signals.

The first switching unit 500 receives the H/V synchronization signals output from the compressor 400 via its first selection port a1 and receives the H/V synchronization signals output from the decoder 150 via its second selection port b1. Then, the switching unit 500 selectively outputs the synchronization signals to the information processing unit 300 and the fourth switching unit 800.

The second switching unit 600 receives the compressed R'G'B' signals output from the compressor 400 via its first selection port a2 and receives the RGB signals output from the decoder 150 via its second selection port b2. Subsequently, the switching unit 600 selectively outputs the R'G'B' signals or the RGB signals to the third switching unit 700.

The third switching unit 700 receives the RGB or R'G'B' signals selectively output by the second switching unit 600 via its first selection port a3 and receives the information R"G"B" signals output from the processing unit 300 via its second selection port b3. Afterwards, the switching unit 600 selectively outputs the signals from the second switching unit 600 or the R"G"B" signals from the processing unit 300.

The fourth switching unit 800 receives the H/V synchronization signals output from the first switching unit 500 via its first selection port a4 and receives the H/V synchronization signals output by the processing unit 300 via its second selection port b4. Then, the switching unit 800 selectively outputs the H/V synchronization signals.

The display device also comprises a driver 160, a high-voltage unit 170, a deflector 180, and the CRT 190. The driver 160 inputs the RGB signals output by the third switching unit 700 and inputs the H/V synchronization signals output by the fourth switching unit 800. Then, the driver 160 causes the CRT 190 to display the RGB signals in synchronicity with the synchronization signals. The high-voltage unit 170 also receives the H/V synchronization signals output from the driver 160 and supplies a high voltage to the CRT 190 in accordance with the synchronization signals. Finally, the deflector 180 supplies a deflecting current signal to the CRT 190 for correcting the convergence of the displayed RGB signals in accordance with the synchronization signals output from the driver 160.

A more detailed example of the configuration of the information processing unit 300 is illustrated in FIG. 2. Specifically, the processing unit 300 comprises a central processing unit ("CPU") 310, a program read only memory ("ROM") 320, a main controller 330, a read only memory and digital-to-analog converter ("RAM & DAC") 340, a volatile memory 350, a storage memory 360, and a modem 370.

The CPU 310 manages the overall system and controls the various data transmissions and operations in accordance with the programs stored in the program ROM 320. Accordingly, the program ROM 320 stores the programming necessary for the system control and various kinds of data manipulation.

The main controller 330 inputs various commands and data and generates corresponding commands and data based on the input signals. For example, the controller 330 inputs the key input from the viewer selection device (not shown), the H/V synchronization signals output from the first switching unit 500, and the serial data from the TV microcomputer 200. Also, the controller 330 outputs the H/V synchronization signals to the fourth switching unit 800 and outputs the third and fourth switching control signals SW3 and SW4. Moreover, the controller generates control signals necessary for the overall operation of the system, manages the reception of information data, and controls the processing and display of graphic data.

The RAM & DAC 340 comprises a palette RAM and a digital-to-analog (D/A) converter. The palette RAM receives data processed by the main controller 330 and converts such data into digital RGB data. The D/A converter inputs the digital RGB data from the palette RAM, converts such data into the analog information R"G"B" signals, and outputs such signals to the third switching unit 700.

The volatile memory reads and writes data received under the control of the main controller 330, and the storage memory 360 reads and writes the data stored in the volatile memory 350 under the control of the main controller 330. Also, the controller 330 controls the reception and transmission to and from the VAN via the modem 370. The VAN may mainly comprise a host computer or may be a more complex network of devices. Furthermore, the modem 370 and corresponding telephone line may be replaced by a coaxial cable connected to a cable system.

The operation of displaying a double-picture type screen signal on the above display device will be described below. As shown in FIG. 1, the first comb-filter 110 inputs the main video signal TV1, reduces the noise in the signal TV1, and outputs the main luminance and chrominance signals Y and C. Similarly, the second comb-filter 111 inputs the sub-video signal TV2, reduces the noise in the signal TV2, and outputs the sub luminance and chrominance signals Y and C. The first chrominance processor 120 processes the main luminance and chrominance signals Y and C and supplies the signals Y and C to the first A/D converter 130. Meanwhile, the second chrominance processor 121 processes the sub-luminance and chrominance signals Y and C and supplies the signals Y and C to the second A/D converter 131. Then, first and second A/D converters 130 and 131 convert the analog signals into digital data and supply the converted data to the double window processor 140.

The double window processor 140 processes the digitized main luminance and chrominance signals and the digitized sub luminance and chrominance signals and outputs the processed signals as two analog double-picture type screen signals having a screen ratio of 4:3. Furthermore, the double window processor 140 may be capable of performing a signal processing operation which supplies a double-picture type screen signal having a screen ratio of 16:9 to a screen having a ratio of 4:3 without distortion.

The double-picture type screen signals output from the processor 140 are supplied to the decoder 150. Then, the decoder 150 generates H/V synchronization signals and RGB signals in accordance with the double-picture type screen signals and respectively outputs such signals to the first and second switching units 500 and 600.

The first switching unit 500 inputs the H/V synchronization signals output from the decoder 150 and supplies them to the driver 160 via the fourth switching unit 800. Similarly, the second switching unit 600 inputs the RGB signals output from the decoder 150 and supplies them to the driver 160 via the third switching unit 700. The RGB signals input by the driver 160 are velocity-modulated and are then displayed on the CRT 190.

Figure 3A:
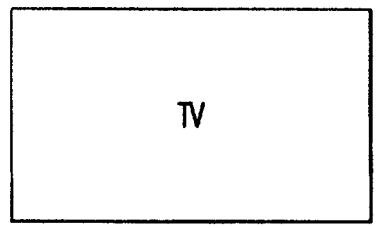
FIG. 3A shows an illustrative example of a first configuration in which video signals are displayed by the display device illustrated in FIG. 1.
Figure 3E:
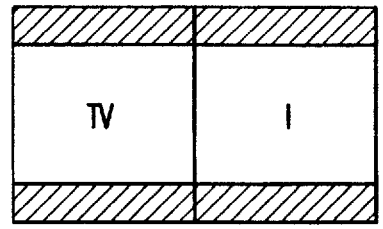
FIG. 3E shows an illustrative example of a fifth configuration in which video signals are displayed by the display device illustrated in FIG. 1.
Figure 3B:
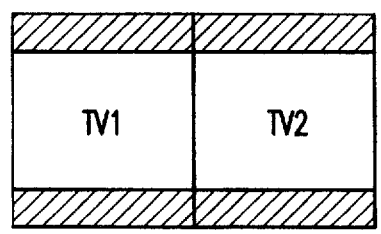
FIG. 3B shows an illustrative example of a second configuration in which video signals are displayed by the display device illustrated in FIG. 1.

FIG. 3A illustrates an example of the CRT 190 when it is displaying a video signal having a screen ratio of 16:9, and FIG. 3B shows an example of the CRT 190 when it is displaying the main video signal TV1 and the sub-video signal TV2 via the double window scanning method. When the main and sub-video signals TV1 and TV2 both have a screen ratio of approximately 4:3 and are displayed on the CRT 190 having a screen ratio of 16:9, the upper and lower portions of the CRT 190 are blacked-out and represent unscanned portions.

The high-voltage unit 170 and the deflector 180 each input the H/V synchronization signals output from the decoder 150 via the driver 160 and supply a high voltage and a deflecting current signal to the CRT 190, respectively. In addition, distortions in the pictures displayed on the two screens having a ratio of 4:3 can be avoided by varying a vertical deflecting current signal and a vertical blanking signal.

In the present embodiment, the display device further comprises the information processing unit 300, the compressor, and the switching units 500, 600, 700, and 800 in order to enable the device to display information data and a VGA signal on the double-picture type screen of the double window television. In order to more fully understand how information data is displayed, an example of the operation of the information processing unit 300 will be described in detail with reference to FIG. 2.

The CPU 310 performs data processing for various peripheral functions. Moreover, in order to properly control the data processing of the CPU 310, the main controller 330 generates and outputs various interrupt signals to CPU 310. The interrupt signals transmitted by the controller 330 may correspond to interrupt signals received via the modem 370 and/or various tasks performed by the main controller 330.

The tasks of the main controller 330 are typically performed in accordance with the key inputs supplied by the viewer selection device (not shown), the vertical blanking time of a displayed signal, the value of an internal timer of the controller 330, predetermined functions performed by the controller 330, or serial data input from the TV microcomputer 200. When the main controller 330 determines that the CPU 310 should perform a particular task, the controller 330 generates an appropriate interrupt signal and outputs such signal to the CPU 310. Upon receiving the interrupt signal, the CPU 310 performs the proper operation.

The programming and data necessary for the CPU 310 to perform its appropriate operations are stored in the program ROM 320. For example, the program ROM 320 may store programming necessary for system operations, data for different graphic fonts, and various kinds of decoding programs and data. Thus, upon receiving an interrupt from the main controller 330, the CPU 310 reads programming and data from the program ROM 320 and executes a series of corresponding operations.

For instance, if a viewer desires to set the display device in a communication mode to receive information from the VAN, the viewer inputs the proper command via the viewer selection device. As a result, a key input is supplied to the main controller 330, and the controller 330 outputs a corresponding interrupt signal to the CPU 310. Then, the CPU 310 executes a particular program stored in the program ROM 320 to place the system in the communication mode.

Then, the viewer inputs the data for the telephone number used to connect the system to the VAN, and a corresponding key input is input by the main controller 330. Afterwards, a corresponding command is transmitted from the controller 330 to the CPU 310, and the CPU 310 transmits the telephone number to the modem 370. As a result, the modem 370 outputs the appropriate telephone number to the VAN and connects the information processing unit 300 to the VAN.

Once the processor 300 is connected to the VAN, a communication command is input. If the data corresponding to the communication command is transmitted to the host computer via the modem 370, the host computer sends information data to the processor 300 in accordance with the communication command.

The information data transmitted via the modem 370 is demodulated and supplied to the main controller 330, and the controller 330 stores the data in a predetermined region of the volatile memory 350. Subsequently, the controller 330 reads the data from the volatile memory 350 in synchronicity with the H/V synchronization signals output from the decoder 150 and generates a corresponding graphics signal for an information picture to be displayed on the CRT 190. The graphics signal is output to the RAM & DAC 340 and is converted into analog information R"G"B" signals.

In addition, the main controller 330 generates control signals necessary for the overall system. For example, when the display device is displaying RGB signals from the decoder 150 and information R"G"B" signals from the processing unit 300, the controller 330 receives the external H/V synchronization signals generated in the decoder 150 in order to synchronize the operations of the processing unit 300 with such synchronizing signals. For example, the unit 300 uses the external synchronizing signals when it superposes the information data on the TV signal. Similarly, when the display device is displaying the compressed R'G'B' signals from the compressor 400 and information R"G"B" signals from the processing unit 300, the controller 330 receives the H/V synchronization signals generated by the compressor 400 in order to superpose the information data on the VGA signal.

The main controller 330 inputs the external H/V synchronization signals from either the decoder 150 or the compressor 400 and generates an internal H/V synchronization is signal. Then, such signal is output to the second selection port b4 of the fourth switching unit 800. In addition, the main controller 330 generates third and fourth switching control signals SW3 and SW4 to respectively control the switching operation of the third and fourth switching units 700 and 800.

The main controller 330 also converts parallel data output from the CPU 310 into serial data and outputs the serial data to the TV microcomputer 200. Conversely, the controller 330 converts the serial data received from the TV microcomputer 200 into parallel data and supplies the parallel data to the CPU 310. Thus, the controller 330 acts as an interface between the CPU 310 and the TV microcomputer 200.

The volatile memory 350 and the storage memory 360 store the communication information data input from the VAN via the modem 370. The volatile memory 350 has a data storage region and a video refresh region, and the information data for one screen is stored in the data storage region.

If the information data is superposed on a TV signal or a VGA signal, the video refresh region corresponds to a 16:9 screen. Furthermore, the information data is stored in the video refresh region at a location which corresponds to the location on the screen at which the information data is to be superposed. As a result, the stored information data can be easily read by the main controller 330 at the appropriate time to display the data at the appropriate portion on the CRT 190 via the RAM & DAC 340.

If the information data is to be displayed on the entire is screen, the video refresh region corresponds to a 16:9 screen. On the other hand, if the TV signal and information data are displayed on the partitioned screens of the double-picture type screen, the video refresh region corresponds to a 4:3 screen.

The RAM & DAC 340 stores the color data to be displayed on the screen in the internal palette RAM, and the color data is written on the palette RAM under the control of the CPU 310. If pixel data is transmitted from the main controller 330, the RGB color data stored in the corresponding location of the palette RAM are read and converted to analog R"G"B" signals. Then, the R"G"B" signals are output to the second selection port b3 of the third switching unit 300.

The modem 370 comprises a demodulator for demodulating data received from the VAN and comprises an error correction circuit for correcting errors in the demodulated data. Once data is input via the modem 370, the modem 370 stores the data in an internal buffer and generates an interrupt signal to the CPU 310 requesting the data to be transferred to the volatile memory 350. Also, the modem 370 receives digital data to be transmitted from the CPU 310 to the VAN and demodulates and transmits such data to the VAN via the telephone line.

In order to display external VGA signals from a personal computer directly on the double-picture type screen of the CRT 190, the display device must compress the VGA signals to prevent the displayed signal from being distorted. Thus, the external VGA RGB signals are input to the compressor 400 which compresses the VGA signals to compressed R'G'B' signals having is a screen ratio of 16:9. As a result, the displayed R'G'B' signals are not distorted.

In order to selectively display the double-picture type screen signal output from the double window processing unit 100 or the external VGA signal, the TV microcomputer 200 generates first and second switching control signals SW1 and SW2 for controlling the positions of the first and second switching units 500 and 600. Furthermore, the switching control signals SW1 and SW2 may be generated in accordance with a screen selection mode command input via the viewer selection device (not shown).

Also, in order to selectively display the information R"G"B" signals output from the processing unit 300 on the CRT 190, the processing unit 300 generates the third and fourth switching control signals SW3 and SW4 for controlling the positions of the third and fourth switching units 700 and 800. In addition, the switching control signals SW3 and SW4 may be generated in accordance with a screen selection mode command input via the viewer selection device (not shown).

By inputting various screen selection mode commands, the viewer can configure the display device such that the device displays information on the CRT 190 in a desired format. For example, the information may be displayed in one of the formats illustrated in FIGS. 3A to 3G. In order to display information in one of the desired formats mentioned above, the first through fourth switching units 500, 600, 700, and 800 must be positioned appropriately. The switching operation of the switching units 500, 600, 700, and 800 to produce each of the desired formats will be described below.

(1) FIG. 3A illustrates the CRT 190 when television signals are being displayed in a normal television mode. In such mode, the TV microcomputer 200 outputs the first switching control signal SW1 such that the first switching unit 500 outputs the signals supplied to the second input port b1, and the microcomputer 200 outputs the second switching control signal SW2 such that the second switching unit 600 outputs the signals supplied to the second input port b2. In addition, the processing unit 300 outputs the third switching control signal SW3 such that the third switching unit 700 outputs the signals supplied to the first input port a3, and the processor 300 outputs the fourth switching control signal SW4 such that the fourth switching unit 800 outputs the signals supplied to the first input port a4. As a result of the above configuration, the H/V synchronization signals output from the decoder 150 are supplied to the driver 160 via the switching units 500 and 800, and the RGB signals output from the decoder 150 are supplied to the driver 160 via the switching units 600 and 700.

Furthermore, in this configuration, the RGB signals and H/V synchronization signals output from the decoder 150 originate from either the main video signal TV1 or the sub-video signal TV2. Thus, when the RGB signals are displayed, a single television program is displayed on the screen as illustrated in FIG. 3A.

(2) FIG. 3B illustrates the CRT 190 when television signals are being displayed in a double television mode. In such mode, the switching units 500, 600, 700, and 800 are positioned in the same manner as they are in the normal television mode. Specifically, the TV microcomputer 200 outputs the first switching control signal SW1 such that the first switching unit 500 outputs the signals supplied to the second input port b1, and the microcomputer 200 outputs the second switching control signal SW2 such that the second switching unit 600 outputs the signals supplied to the second input port b2. In addition, the processing unit 300 outputs the third switching control signal SW3 such that the third switching unit 700 outputs the signals supplied to the first input port a3, and the processor 300 outputs the fourth switching control signal SW4 such that the fourth switching unit 800 outputs the signals supplied to the first input port a4. As a result of the above configuration, the H/V synchronization signals output from the decoder 150 are supplied to the driver 160 via the switching units 500 and 800, and the RGB signals output from the decoder 150 are supplied to the driver 160 via the switching units 600 and 700.

However, in this configuration, the RGB signals and H/V synchronization signals output from the decoder 150 represent both the main video signal TV1 and the sub-video signal TV2. Thus, when the RGB signals are displayed, both television signals TV1 and TV2 can be simultaneously viewed on the double-picture type screen as shown in FIG. 3B.

Figure 3F:
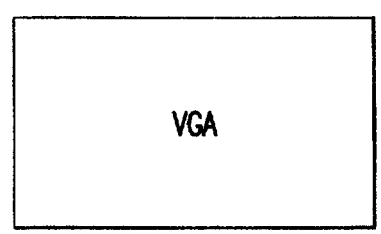
FIG. 3F shows an illustrative example of a sixth configuration in which video signals are displayed by the display device illustrated in FIG. 1.
Figure 3C:
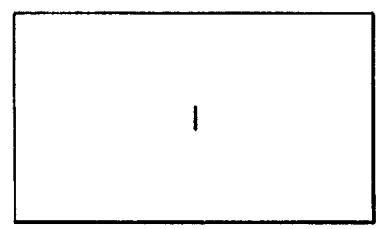
FIG. 3C shows an illustrative example of a third configuration in which video signals are displayed by the display device illustrated in FIG. 1.

(3) FIG. 3C illustrates the CRT 190 when information data output from the processing unit 300 is being displayed in an information data display mode. In such mode, the processing unit 300 outputs the third switching control signal SW3 such that the third switching unit 700 outputs the signals supplied to the second input port b3, and the processor 300 outputs the fourth switching control signal SW4 such that the fourth switching unit 800 outputs the signals supplied to the second input port b4. As a result, the information R"G"B" signals output from the processing unit 300 are supplied to the driver 160 via the switching unit 700, and the H/V synchronization signals output from the processing unit 300 are supplied to the driver 160 via the switching unit 800. Consequently, the information R"G"B" signals are displayed on the entire screen of the CRT 190 as shown in FIG. 3C.

Figure 3G:
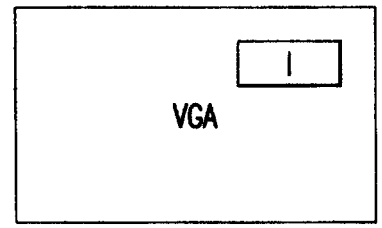
FIG. 3G shows an illustrative example of a seventh configuration in which video signals are displayed by the display device illustrated in FIG. 1.
Figure 3D:
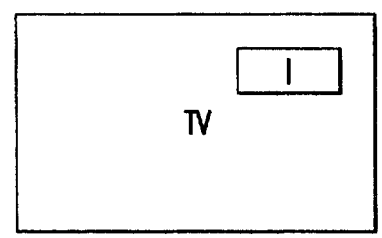
FIG. 3D shows an illustrative example of a fourth configuration in which video signals are displayed by the display device illustrated in FIG. 1.

(4) FIG. 3D illustrates the CRT 190 when information data is superposed over a portion of television signals which are being displayed in a first superposing mode. In such mode, the TV microcomputer 200 outputs the first switching control signal SW1 such that the first switching unit 500 outputs the signals supplied to the second input port b1, and the microcomputer 200 outputs the second switching control signal SW2 such that the second switching unit 600 outputs the signals supplied to the second input port b2. In addition, the processing unit 300 outputs the fourth switching control signal SW4 such that the fourth switching unit 800 outputs the signals supplied to the first input port a4.

Furthermore, during the period when the information data is to be superposed on the television signals, the processing unit 300 outputs the third switching control signal SW3 such that the third switching unit 700 outputs the signals supplied to the second input port b3. On the other hand, during all other times when the information data is not to be superposed on the television signals, the processing unit 300 outputs the third switching control signal SW3 such that the third switching unit 700 outputs the signals supplied to the first input port a3.

As a result of the above configuration, the H/V synchronization signals output from the decoder 150 are supplied to the driver 160 via the switching units 500 and 800. Also, during the period when the information data is to be superposed over the television signals, the information R"G"B" signals are output to the driver 160 via the switching unit 700. However, during the period when the information data is not to be superposed, the RGB signals output from the decoder 150 are supplied to the driver 160 via the switching units 600 and 700.

(5) FIG. 3E illustrates the CRT 190 when television signals and information data are being displayed in a double television and information mode. In such mode, the TV microcomputer 200 outputs the first switching control signal SW1 such that the first switching unit 500 outputs the signals supplied to the second input port b1, and the microcomputer 200 outputs the second switching control signal SW2 such that the second switching unit 600 outputs the signals supplied to the second input port b2. In addition, the processing unit 300 outputs the fourth switching control signal SW4 such that the fourth switching unit 800 outputs the signals supplied to the first input port a4.

Furthermore, during the period when the television signals are to be displayed (i.e. during the first half of the horizontal period of each horizontal line), the processing unit 300 outputs the third switching control signal SW3 such that the third switching unit 700 outputs the signals supplied to the first input port a3. On the other hand, during the period when the information data is to be displayed (i.e. during the last half of the horizontal period of each horizontal line), the processing unit 300 outputs the third switching control signal SW3 such that the third switching unit 700 outputs the signals supplied to the second input port b3.

As a result of the above configuration, the H/V synchronization signals output from the decoder 150 are supplied to the driver 160 via the switching units 500 and 800. Also, during the first half of the horizontal period when the television signals are to be displayed, the RGB signals output from the decoder are output to the driver 160 via the switching units 600 and 700. However, during the second half of the horizontal period when the information data is to be displayed, the information R"G"B" signals output from the processing unit 300 are output to the driver 160 via the switching unit 700.

(6) FIG. 3F illustrates the CRT 190 when external VGA signals are being displayed in a VGA mode. In such mode, the TV microcomputer 200 outputs the first switching control signal SW1 such that the first switching unit 500 outputs the is signals supplied to the first input port a1, and the microcomputer 200 outputs the second switching control signal SW2 such that the second switching unit 600 outputs the signals supplied to the first input port a2. In addition, the processing unit 300 outputs the third switching control signal SW3 such that the third switching unit 700 outputs the signals supplied to the first input port a3, and the processor 300 outputs the fourth switching control signal SW4 such that the fourth switching unit 800 outputs the signals supplied to the first input port a4. As a result of the above configuration, the H/V synchronization signals output from the compressor 400 are supplied to the driver 160 via the switching units 500 and 800, and the compressed R'G'B' signals output from the compressor 400 are supplied to the driver 160 via the switching units 600 and 700. Consequently, the external VGA signals input (e.g. from a personal computer) are displayed on the entire double-picture type screen having a screen ratio of 16:9 as shown in FIG. 3F.

(7) FIG. 3G illustrates the CRT 190 when information data is superposed over a portion of VGA signals which are being displayed in a second superposing mode. In such mode, the TV microcomputer 200 outputs the first switching control signal SW1 such that the first switching unit 500 outputs the signals supplied to the first input port a1, and the microcomputer 200 outputs the second switching control signal SW2 such that the second switching unit 600 outputs the signals supplied to the first input port a2. In addition, the processing unit 300 outputs the fourth switching control signal SW4 such that the fourth switching unit 800 outputs the signals supplied to the first input port a4.

Furthermore, during the period when the information data is to be superposed on the VGA signals, the processing unit 300 outputs the third switching control signal SW3 such that the third switching unit 700 outputs the signals supplied to the second input port b3. On the other hand, during all other times when the information data is not to be superposed on the VGA signals, the processing unit 300 outputs the third switching control signal SW3 such that the third switching unit 700 outputs the signals supplied to the first input port a3.

As a result of the above configuration, the H/V synchronization signals output from the compressor 400 are supplied to the driver 160 via the switching units 500 and 800. Also, during the period when the information data is to be superposed over the VGA signals, the information R"G"B" signals are output to the driver 160 via the switching unit 700. However, during the period when the information data is not to be superposed, the R'G'B' signals output from the compressor 400 are supplied to the driver 160 via the switching units 600 and 700.

As described above, the present invention is capable of displaying information signals or VGA signals in various configurations on a double-picture type screen by incorporating the double window television having a communication function. Also, the present invention is capable of displaying information signals or VGA signals on a screen having a 16:9 screen ratio.

While only certain embodiments of the invention have been specifically described herein, it will be apparent that numerous modifications may be made thereto without departing from the spirit and scope of the invention.

What is claimed is:

1. A display device capable of displaying a first video signal and a second video signal on a display of a double-picture type screen, said device comprising:

a double window processing unit for processing said first video signal and said second video signal to be displayed on said double-picture type screen, wherein said double window processing unit outputs a television video signal and first horizontal and vertical synchronization signals which correspond to at least one of said first video signal and said second video signal;

information processing means for receiving information data from a value added network, wherein said information processing means outputs an information video signal relating to said information data, generates second horizontal and vertical synchronization signals corresponding to said information video signal, and outputs first and second switching control signals;

first switching means for selectively outputting either said television video signal or said information video signal as a selected video signal in accordance with said first switching control signal;

second switching means for selectively outputting either said first horizontal and vertical synchronization signals or said second horizontal and vertical synchronization signals as selected synchronization signals in accordance with said second switching control signal; and display control means for causing said selected video signal to be displayed on said display in accordance with said selected synchronization signals.

2. A display device as claimed in claim 1, wherein said first switching control signal causes said first switching means to output said television video signal to said display control means as said selected video signal, wherein said second switching control signal causes said second switching means to output said first horizontal and vertical synchronization signals to said display control means as said selected synchronization signals, and wherein said television video signal corresponds to one of said first video signal and said second video signal such that said television video signal is displayed on said double-picture type screen as a single television program.

3. A display device as claimed in claim 1, wherein said first switching control signal causes said first switching means to output said television video signal to said display control means as said selected video signal, wherein said second switching control signal causes said second switching means to output said first horizontal and vertical synchronization signals to said display control means as said selected synchronization signals, and wherein said television video signal corresponds to both of said first video signal and said second video signal such that said television video signal is displayed on said double-picture type screen as two television programs.

4. A display device as claimed in claim 1, wherein said first switching control signal causes said first switching means to output said information video signal to said display control means as said selected video signal, wherein said second switching control signal causes said second switching means to output said second horizontal and vertical synchronization signals to said display control means as said selected synchronization signals, and wherein said display control means displays said information video signal on said double-picture type screen as a single information program.

5. A display device as claimed in claim 1, wherein said first switching control signal causes said first switching means to output said information video signal to said display control means as said selected video signal for a certain portion of time that signals are displayed on said double-picture type screen, wherein said first switching control signal causes said first switching means to output said television video signal to said display control means as said selected video signal for a remaining portion of time that signals are displayed on said double-picture type screen, wherein said second switching control signal causes said second switching means to output said first horizontal and vertical synchronization signals to said display control means as said selected synchronization signals, and wherein said certain portion of time and said remaining portion of time are such that said display control means displays said television video signal on said double-picture type screen and superposes said information video signal on said television video signal at a desired location of said double-picture type screen.

6. A display device as claimed in claim 1, wherein said first switching control signal causes said first switching means to output said information video signal to said display control means as said selected video signal for a first portion of time that signals are displayed on said double-picture type screen, wherein said first switching control signal causes said first switching means to output said television video signal to said display control means as said selected video signal for a second portion of time that signals are displayed on said double-picture type screen, wherein said second switching control signal causes said second switching means to output said first horizontal and vertical synchronization signals to said display control means as said selected synchronization signals, wherein said double-picture type screen is partitioned into a first half and a second half, and wherein said first portion of time and said second portion of time are such that said display control means displays said information video signal on said first half of said double-picture type screen and displays said television video signal on said second half of said double-picture type screen.

7. A display device capable of displaying a first video signal and a second video signal on a display of a double-picture type screen, said device comprising:

compressing means for receiving an external video signal and compressing said external video signal into a compressed video signal, wherein said compressing means further outputs first horizontal and vertical synchronization signals corresponding to said compressed video signal;

information processing means for receiving information data from a value added network, wherein said information processing means outputs an information video signal relating to said information data, generates second horizontal and vertical synchronization signals corresponding to said information video signal, and outputs first and second switching control signals;

first switching means for selectively outputting either said compressed video signal or said information video signal as a selected video signal in accordance with said first switching control signal;

second switching means for selectively outputting either said first horizontal and vertical synchronization signals or said second horizontal and vertical synchronization signals as selected synchronization signals in accordance with said second switching control signal; and display control means for causing said selected video signal to be displayed on said display in accordance with said selected synchronization signals.

8. A display device as claimed in claim 7, wherein said first switching control signal causes said first switching means to output said compressed video signal to said display control means as said selected video signal, wherein said second switching control signal causes said second switching means to output said first horizontal and vertical synchronization signals to said display control means as said selected synchronization signals, and wherein said display control means displays said compressed video signal on said double-picture type screen as a single external video program.

9. A display device as claimed in claim 7, wherein said first switching control signal causes said first switching means to output said information video signal to said display control means as said selected video signal, wherein said second switching control signal causes said second switching means to output said second horizontal and vertical synchronization signals to said display control means as said selected synchronization signals, and wherein said display control means displays said information video signal on said double-picture type screen as a single information program.

10. A display device as claimed in claim 7, wherein said first switching control signal causes said first switching means to output said information video signal to said display control means as said selected video signal for a certain portion of time that signals are displayed on said double-picture type screen, wherein said first switching control signal causes said first switching means to output said compressed video signal to said display control means as said selected video signal for a remaining portion of time that signals are displayed on said double-picture type screen, wherein said second switching control signal causes said second switching means to output said first horizontal and vertical synchronization signals to said display control means as said selected synchronization signals, and wherein said certain portion of time and said remaining portion of time are such that said display control means displays said compressed video signal on said double-picture type screen and superposes said information video signal on said compressed video signal at a desired location of said double-picture type screen.

11. A display device as claimed in claim 7, wherein said external video signal is a video graphics array signal.

12. A display device as claimed in claim 11, wherein said compressing means compresses said video graphics array signal by three-fourths to produce said compressed video signal.

13. A display device capable of displaying a first video signal and a second video signal on a display of a double-picture type screen, said device comprising:

a double window processing unit for processing said first video signal and said second video signal to be displayed on said double-picture type screen, wherein said double window processing unit outputs a television video signal and first horizontal and vertical synchronization signals which correspond to at least one of said first video signal and said second video signal;

a television microcomputer for controlling an operation of said double window processing unit and for outputting a first switching control signal and a second switching control signal;

information processing means for receiving information data from a value added network, wherein said information processing means outputs an information video signal relating to said information data, generates second horizontal and vertical synchronization signals corresponding to said information video signal, and outputs third and fourth switching control signals;

compressing means for receiving an external video signal and compressing said external video signal into a compressed video signal, wherein said compressing means further outputs third horizontal and vertical synchronization signals corresponding to said compressed video signal;

first switching means for selectively outputting either said first horizontal and vertical synchronization signals or said third horizontal and vertical synchronization signals as intermediate synchronization signals in accordance with said first switching control signal;

second switching means for selectively outputting either said television video signal or said compressed video signal as an intermediate video signal in accordance with said second switching control signal;

third switching means for selectively outputting either said intermediate video signal or said information video signal as a selected video signal in accordance with said third switching control signal;

fourth switching means for selectively outputting either said intermediate synchronization signals or said second horizontal and vertical synchronization signals as selected synchronization signals in accordance with said fourth switching control signal; and a display control means for causing said selected video signal to be displayed on said display in accordance with said selected synchronization signals.

14. A display device as claimed in claim 13, wherein said second switching control signal causes said second switching means to output said television video signal as said intermediate video signal, wherein said third switching control signal causes said third switching means to output said intermediate video signal as said selected video signal so that said television signal is output as said selected video signal to said display control means, wherein said first switching control signal causes said first switching means to output said first horizontal and vertical synchronization signals as said intermediate synchronization signals, wherein said fourth switching control signal causes said fourth switching control means to output said intermediate synchronization signals as said selected synchronization signals so that said first horizontal and vertical synchronization signals are output to said display control means, and wherein said television video signal corresponds to one of said first video signal and said second video signal such that said television video signal is displayed on said double-picture type screen as a single television program.

15. A display device as claimed in claim 13, wherein said second switching control signal causes said second switching means to output said television video signal as said intermediate video signal, wherein said third switching control signal causes said third switching means to output said intermediate video signal as said selected video signal so that said television signal is output as said selected video signal to said display control means, wherein said first switching control signal causes said first switching means to output said first horizontal and vertical synchronization signals as said intermediate synchronization signals, wherein said fourth switching control signal causes said fourth switching control means to output said intermediate synchronization signals as said selected synchronization signals so that said first horizontal and vertical synchronization signals are output to said display control means, and wherein said television video signal corresponds to both of said first video signal and said second video signal such that said television video signal is displayed on said double-picture type screen as two television programs.

16. A display device as claimed in claim 13, wherein said third switching control signal causes said third switching means to output said information video signal to said display control means as said selected video signal, wherein said fourth switching control signal causes said fourth switching means to output said second horizontal and vertical synchronization signals to said display control means as said selected synchronization signals, and wherein said display control means displays said information video signal on said double-picture type screen as a single information program.

17. A display device as claimed in claim 13, wherein said first switching control signal causes said first switching means to output said first horizontal and vertical synchronization signals as said intermediate synchronization signals, wherein said fourth switching control signal causes said fourth switching means to output said intermediate synchronization signals as said selected synchronization signals so that said first horizontal and vertical synchronization signals are output to said display control means, wherein said second switching control signal causes said second switching means to output said television video signal as said intermediate video signal, wherein said third switching control signal causes said third switching means to output said information video signal to said display control means as said selected video signal for a certain portion of time that signals are displayed on said double-picture type screen, wherein said third switching control signal causes said third switching means to output said intermediate video signal to said display control means as said selected video signal for a remaining portion of time that signals are displayed on said double-picture type screen, and wherein said certain portion of time and said remaining portion of time are such that said display control means displays said television video signal on said double-picture type screen and superposes said information video signal on said television video signal at a desired location of said double-picture type screen.

18. A display device as claimed in claim 13, wherein said first switching control signal causes said first switching means to output said first horizontal and vertical synchronization signals as said intermediate synchronization signals, wherein said fourth switching control signal causes said fourth switching means to output said intermediate synchronization signals as said selected synchronization signals so that said first horizontal and vertical synchronization signals are output to said display control means, wherein said second switching control signal causes said second switching means to output said television video signal as said intermediate video signal, wherein said third switching control signal causes said third switching means to output said information video signal to said display control means as said selected video signal for a first portion of time that signals are displayed on said double-picture type screen, wherein said third switching control signal causes said third switching means to output said intermediate video signal to said display control means as said selected video signal for a second portion of time that signals are displayed on said double-picture type screen, wherein said double-picture type screen is partitioned into a first half and a second half, and wherein said first portion of time and said second portion of time are such that said display control means displays said information video signal on said first half of said double-picture type screen and displays said television video signal on said second half of said double-picture type screen.

19. A display device as claimed in claim 13, wherein said second switching control signal causes said second switching means to output said compressed video signal as said intermediate video signal, wherein said third switching control signal causes said third switching means to output said intermediate video signal as said selected video signal so that said compressed video signal is output as said selected video signal to said display control means, wherein said first switching control signal causes said first switching means to output said third horizontal and vertical synchronization signals as said intermediate synchronization signals, wherein said fourth switching control signal causes said fourth switching control means to output said intermediate synchronization signals as said selected synchronization signals so that said third horizontal and vertical synchronization signals are output to said display control means, and wherein said display control means displays said compressed video signal on said double-picture type screen as a single external video program.

20. A display device as claimed in claim 13, wherein said first switching control signal causes said first switching means to output said third horizontal and vertical synchronization signals as said intermediate synchronization signals, wherein said fourth switching control signal causes said fourth switching means to output said intermediate synchronization signals as said selected synchronization signals so that said third horizontal and vertical synchronization signals are output to said display control means, wherein said second switching control signal causes said second switching means to output said compressed video signal as said intermediate video signal, wherein said third switching control signal causes said third switching means to output said information video signal to said display control means as said selected video signal for a certain portion of time that signals are displayed on said double-picture type screen, wherein said third switching control signal causes said third switching means to output said intermediate video signal to said display control means as said selected video signal for a remaining portion of time that signals are displayed on said double-picture type screen, and wherein said certain portion of time and said remaining portion of time are such that said display control means displays said compressed video signal on said double-picture type screen and superposes said information video signal on said compressed video signal at a desired location of said double-picture type screen.

21. A display device as claimed in claim 13, wherein said external video signal is a video graphics array signal.

22. A display device as claimed in claim 21, wherein said compressing means compresses said video graphics array signal by three-fourths to produce said compressed video signal.

23. A display device as claimed in claim 1, wherein said information processing unit comprises:

a program read only memory ("ROM") which stores programming necessary for controlling said display device;

a central processing unit ("CPU") for controlling said display device and performing data transmission operations in accordance with said programming stored in said program ROM;

a main controller, wherein said main controller inputs a screen selection key input and generates said first switching control signal and said second switching control signal in accordance with said screen selection key input, wherein said main controller inputs said first horizontal and vertical synchronization signals and synchronizes a superposition of said information video signal on said television video signal in accordance with said first horizontal and vertical synchronization signals, and wherein said main controller generates said second horizontal and vertical sync signals for said information video signal;

a random access memory and digital to analog converter ("RAM & DAC") which comprises a palette random access memory ("RAM") that converts data processed by said main controller into information video data and which comprises a digital-to-analog converter that converts said information video data into said information video signal;

a memory for writing and/or reading said information video data which corresponds to said information video signal based on instructions from said main controller; and a modem for receiving and transmitting information data from said value added network based on an instruction from said main controller.

24. A display device as claimed in claim 23, wherein said memory writes and/or reads said information video data in a manner which corresponds to whether said information video signal is to be displayed on substantially an entire portion of said double-picture type screen, superposed on said television video signal, or displayed on a partitioned half of said double-picture type screen.

25. A display device as claimed in claim 7, wherein said information processing unit comprises:

a program read only memory ("ROM") which stores programming necessary for controlling said display device;

a central processing unit ("CPU") for controlling said display device and performing data transmission operations in accordance with said programming stored in said program ROM;

a main controller, wherein said main controller inputs a screen selection key input and generates said first switching control signal and said second switching control signal in accordance with said screen selection key input, wherein said main controller inputs said first horizontal and vertical synchronization signals and synchronizes a superposition of said information video signal on said compressed video signal is in accordance with said first horizontal and vertical synchronization signals, and wherein said main controller generates said second horizontal and vertical sync signals for said information video signal;

a random access memory and digital to analog converter ("RAM & DAC") which comprises a palette random access memory ("RAM") that converts data processed by said main controller into information video data and which comprises a digital-to-analog converter that converts said information video data into said information video signal;

a memory for writing and/or reading said information video data which corresponds to said information video signal based on instructions from said main controller; and a modem for receiving and transmitting information data from said value added network based on an instruction from said main controller.

26. A display device as claimed in claim 25, wherein said memory writes and/or reads said information video data in a manner which corresponds to whether said information video signal is to be displayed on substantially an entire portion of said double-picture type screen or superposed on said compressed video signal.

27. A display device as claimed in claim 13, wherein said information processing unit comprises:

a program read only memory ("ROM") which stores programming necessary for controlling said display device;

a central processing unit ("CPU") for controlling said display device and performing data transmission operations in accordance with said programming stored in said program ROM;

a main controller, wherein said main controller inputs a screen selection key input and generates said third switching control signal and said fourth switching control signal in accordance with said screen selection key input, wherein said main controller inputs said intermediate synchronization signals and synchronizes a superposition of said information video signal on said intermediate video signal in accordance is with said intermediate synchronization signals, and wherein said main controller generates said second horizontal and vertical sync signals for said information video signal;

a random access memory and digital to analog converter ("RAM & DAC") which comprises a palette random access memory ("RAM") that converts data processed by said main controller into information video data and which comprises a digital-to-analog converter that converts said information video data into said information video signal;

a memory for writing and/or reading said information video data which corresponds to said information video signal based on instructions from said main controller; and a modem for receiving and transmitting information data from said value added network based on an instruction from said main controller.

28. A display device as claimed in claim 27, wherein said memory writes and/or reads said information video data in a manner which corresponds to whether said information video signal is to be displayed on substantially an entire portion of said double-picture type screen, superposed on said intermediate video signal, or displayed on a partitioned half of said double-picture type screen.

* * * * *